(12) United States Patent
Knop et al.

(10) Patent No.: US 7,003,645 B2
(45) Date of Patent: Feb. 21, 2006

(54) USE OF A STORAGE MEDIUM AS A COMMUNICATIONS NETWORK FOR LIVENESS DETERMINATION IN A HIGH-AVAILABILITY CLUSTER

(75) Inventors: Felipe Knop, Poughkeepsie, NY (US); John R. Hare, Beacon, NY (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 10/323,010

(22) Filed: Dec. 18, 2002

(65) Prior Publication Data
US 2004/0123050 A1  Jun. 24, 2004

(51) Int. Cl.
*G06F 12/06* (2006.01)

(52) U.S. Cl. .................. 711/170; 711/147; 711/140; 711/169

(58) Field of Classification Search ............... 711/170, 711/147, 150, 140, 169; 710/66
See application file for complete search history.

(56) References Cited

U.S. PATENT DOCUMENTS

| | | | |
|---|---|---|---|
| 5,694,550 A | 12/1997 | Takeda et al. | 395/200.11 |
| 6,151,688 A | 11/2000 | Wipfel et al. | 714/48 |
| 6,304,980 B1 * | 10/2001 | Beardsley et al. | 714/6 |
| 6,735,200 B1 * | 5/2004 | Novaes | 370/390 |
| 2002/0078312 A1 | 6/2002 | Wang-Knop et al. | 711/150 |
| 2002/0165964 A1 * | 11/2002 | Chen et al. | 709/226 |

OTHER PUBLICATIONS

Agesen et al., "Garbage Collection and Local Variable Type Precision and Liveness Machine," ACM Sigplan Notices, vol. 33, No. 5, pp. 269-279 (May, 1998).*

* cited by examiner

*Primary Examiner*—Pierre-Michel Bataille
(74) *Attorney, Agent, or Firm*—Lawrence D. Cutter; Jon A. Gibbons; Fleit, Kain, Gibbons, Gutman, Bongini & Bianco P.L.

(57) ABSTRACT

Liveness determination in a multinode data processing system is enhanced through the use of a shared nonvolatile memory, typically a disk, which is utilized in conjunction with defined transmission protocols to provide an independent communication path usable for both the transmission of node liveness information and for other, more general, data transfer purposes. This path is considered as having the same degree of importance as other network paths and liveness indications from the shared memory path are likewise considered at the same time as liveness indications from another path or paths.

13 Claims, 5 Drawing Sheets

USE OF A STORAGE MEDIUM AS A COMMUNICATIONS NETWORK FOR LIVENESS DETERMINATION IN A HIGH-AVAILABILITY CLUSTER

BACKGROUND OF THE INVENTION

In a high-availability cluster, it is very important to be able to distinguish between a remote node which has failed and a network partitioning event since these events are handled in very different ways. Unfortunately, a network partition presents the same set of symptoms to system monitoring routines as does a remote node failure. In particular, while it is safe to take over the resources from a failed node, it is not safe to do so in the case of a node which appears to have failed because of a network partition.

Before discussing the problems solved by the present invention, it is worth describing the context and environment in which the invention is most advantageously employed. In particular, the present invention operates in a multinode data processing system. An exemplar system of this kind is found in the pSeries of data processing machines manufactured and sold by International Business Machines, Inc., the assignee of the present invention. Exemplary systems comprise a plurality of independent data processing nodes, each having its own independent memory and its own operating system software (though it is noted that in typical configurations of nodes whose efforts are plied against a particular problem, it is more often the case that the same operating system is employed on all nodes assigned). These systems operate in both parallel and distributed fashions to accomplish well-defined, user-specified data processing goals. Exemplar machines of this type typically communicate through the exchange of messages, perhaps through a publicly defined protocol such as IBM's Message Passing Interface (MPI). In order to solve specific problems or to provide higher availability, the nodes are organizable into clusters of select nodes. This organization can be orchestrated in the pSeries of machines through a program product called HACMP (High Availability Cluster Multiprocessing). HACMP provides the ability for applications to continue to run even in the presence of node, network and/or adapter failure. It is also noted that some or all of the nodes present may, from time to time, join and depart from various node groupings. In the event of node failure, HACMP provides a mechanism in which the work of a failed node may be picked up by other nodes. However, it is important that the user's application work proceed, especially in those cases where the user's application consumes lengthy amounts of data processing time and/or in those cases in which restarting is impractical. Accordingly, group membership is fluid. This fluidity allows data processing work to continue independently of the actual node on which the work is being done. It is therefore seen that fluidity in group membership provides a powerful advantage in distributed and parallel processing environments; however, as discussed above, the fluidity provided via network partition can also appear to the monitoring system (HACMP, for example) that a node failure has occurred. The problem then becomes how to distinguish such an event, which may be caused by a network failure or a failure in all of the node's network adapters, from an actual node failure.

Several techniques are usable to assist in providing an indication of between these two cases. In particular, node liveness checks may be carried out using a shared disk path which provides a backup communication path for the case where the main communication networks fail. Main communication paths include the use of redundant IP-based (Internet Protocol) networks and also non-IP networks such as RS-232 ports and lines.

This present invention employs the use of a shared disk as a liveness determination medium. Techniques are introduced to make a shared disk behave as a communications network from the point of view of a liveness determination subsystem in a distributed cluster. Other cluster subsystems use a shared disk as "quorum device" or as a backup communication substrate, but none of them use the disk as part of a "heartbeating network." Using the disk as a quorum device works, but forces both sides of the "partition" to go through their recovery procedures, while "disk heartbeating" allows the two sides of the partition to keep working as before, since each side will know that the other side is alive.

SUMMARY OF THE INVENTION

In accordance with one embodiment of the present invention a method is provided for determining liveness in a cluster of data processing nodes in which there are at least two paths present for communicating liveness information and in which at least one of the paths includes a shared disk and in which said this shared disk path is employed substantially continuously and concurrently with other liveness determination paths. This avoids the necessity of determining liveness by having to resort to secondary communication paths whose use requires startup overhead. The use of such secondary communication paths are typically triggered by indications of liveness failure over different communication paths. In contrast, the disk communication path provided by the present invention operates in a substantially continuous, parallel fashion. In determining node liveness the shared disk communication path is capable of participating on an equal footing with liveness determination signals received via other, more typical paths.

In order to provide an appropriate communication path through a shared disk (or other non-volatile storage medium), the shared disk is provided with control and data sectors which are associated with its own node in the cluster. Each control sector contains a read portion and a write portion. Only the associated node is allowed to write data into its write portion. The read portion contains data intended to be read by its a non-owning node. This structure coupled with the use of sequence numbers enables the shared disk to operate as an independent communication path for liveness (or other) information.

Accordingly, it is an object of the present invention to use a shared disk in a manner which effectively provides a new, separate and independent network path for internodal communication.

It is also an object of the present invention to use a shared disk as a mechanism for liveness determination in a multinode data processing system.

It is a still further object of the present invention to provide a new and independent communciation path through the use of a shared disk mechanism and to have that path considered equally with other paths used for liveness determination.

It is yet another object of the present invention to avoid the overhead associated with the ad hoc establishment of disk based liveness determination channels.

It is also an object of the present invention to provide a protocol for the use of shared disk (or other non-volatile storage devices) so that they can also function as network communication channels.

It is a still further object of the present invention to use the above-mentioned shared disk communication path in an efficient manner by avoiding unnecessary disk access operations.

It is yet another object of the present invention to provide non-volatile storage system data structures which are capable of transferring sectors of information containing both control and data information as well as providing data structures which include sectors containing only data.

Lastly, but not limited hereto, it is an object of the present invention to increase the reliability and performance of multinode data processing systems, particularly by taking advantage of existing shared data storage resources and using them in unexpected ways.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRITPION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

1—Background

Preliminarily, it is noted that "adapter," as that term is used herein, refers to a communication device that connects hardware data processing nodes to various forms of communication networks or to a switch. In the pSeries of products mentioned above, the switch or network is responsible for the transmission of messages from one node to a designated node, and more specifically to one of the adapters connected to the designated node. The determination of node liveness and proper adapter functioning, particularly as it relates to the appearance of node failure arising out of communication problems, lie at the heart of highly available distributed cluster data processing systems. In order to provide high availability services, a cluster system should be able to determine which nodes, networks, and network adapters in the system are working. Failures in any of these components should be detected, the information about the failure passed on to higher level software subsystems, and if possible recovered by the cluster software and application programs.

Determination of node, network, and network adapter liveness is often made through the use of daemon processes running in each node of the distributed system. Daemons run distributed protocols and they exchange liveness messages that are forced through different network paths in the data processing system. If no such liveness messages are received within a predetermined time interval, then either the sending node or a network adapter is assumed not to be working, that is, it is considered by the other nodes to be "dead."

In a high-availability data processing cluster, precise determination of adapter, network, and node events is very important, since the cluster manager subsystem reacts to such events in an attempt to give the appearance to the end-user that cluster resources are still available. For example, if a node in the cluster fails, the cluster manager transfers any resources being hosted or controlled by the failed node to another node which is working. (In the pSeries of data processing systems mentioned above, the function of cluster manager is provided by a program product called HACMP). In such a case, if a node is detected as down ("dead"), the correct behavior of the cluster depends on the detected-down-node actually being down. Otherwise, if the node is not in fact down, there is a very good possibility that there would be two nodes in the cluster both trying to control the same resource. Such resource concurrency can have devastating effects for the cluster, especially if the resource is a disk, in which case the result may be a corrupted database or file system.

Figure 1:
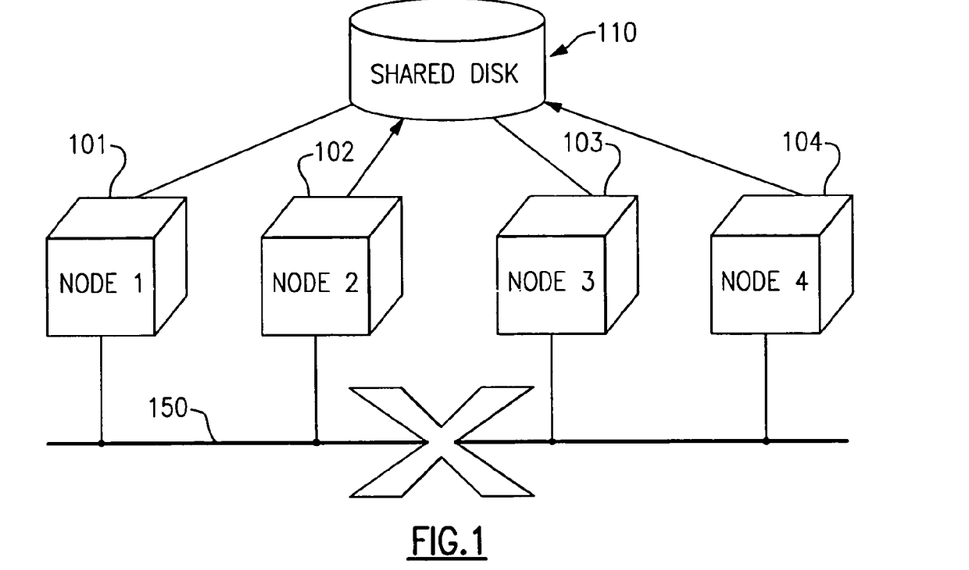
FIG. 1 is a schematic block diagram illustrating the environment in which the present invention is employed and more particularly illustrating the nature of the problem solved.

FIG. 1 illustrates the multinode, shared storage environment in which the present invention is employed. Only four nodes are shown for convenience. In particular Node 1, Node 2, Node 3 and Node 4 (reference numerals 101 to 104, respectively) have access to nonvolatile storage device 110, which for purposes of more easily understanding the operation and advantages of the present invention, is best thought of as comprising a rotating magnetic disk storage device. Nodes 101 to 104 also communicate over network 150, typically via the use of Internet Protocol (IP) transmissions. It is a failure in this path, which is the usual medium for the transmission of node liveness information, that the present invention is meant to guard against and to augment. It is noted though that the present invention is capable of operating as more than just a backup path and that it is also equally capable of transferring data of the same kind that is carried by network 150. FIG. 1 particularly illustrates the situation in which when the network is intact, Nodes 101 to 104 can communicate and shared disk 110 is owned by Node 104. When the network connection fails, as indicated by the break shown by the large "X", Nodes 101 and 102 consider Nodes 103 and 104 as having failed. This could otherwise cause Node 102 to take ownership of the disk, leading to possible disk corruption, since Node 104 is still writing to the disk. The present invention provides a mechanism to help guard against this eventuality and to provide other services as well.

In order to provide precise adapter/node event notifications in anticipation of situations illustrated in FIG. 1, the liveness subsystem generally contends with two common sources of "false events":

(1) daemons being blocked due to CPU or memory starvation (or possibly other causes), which results in liveness messages not being sent in time;

(2) network problems that prevent the liveness messages from reaching their destinations.

The network problems in item (2) above are the specific problems addressed by the methods of the present.

A typical solution for the subject network problems is to configure the cluster with multiple networks, or at least with multiple adapters in each node, all connected to the same network. Having multiple adapters in a node prevents a failure in one adapter from causing the hosting node from being flagged as being down. On the other hand, having multiple networks, in contrast to having multiple adapters, prevents a failure in one of the networks from causing all nodes to be detected as down by each other.

2—Disk Heartbeating

While the use of multiple networks seems to address the problem of outages within individual networks and adapters, a concern still remains that the IP subsystem becomes a single-point-of-failure: if IP communication fails, then one or more nodes may be "isolated" and may be incorrectly detected as being down. In this regard it is noted that the IP subsystem is the part of the operating system that manages the flow of IP information packets between application programs and the network. Because of the possibility of this incorrect detection, clusters often resort to "non-IP heartbeating," which consists in using communication media that don't rely on IP for the purpose of transmitting liveness information. The use of "non-IP" networks thus avoids the single-point-of-failure created by depending on IP communications to convey liveness information among nodes in a cluster.

One type of "non-IP" network is an RS-232 serial line connecting a pair of nodes. Serial connections are relatively inexpensive, and basic support for such a connection is already usually available within the operating system kernel to transmit data through the RS-232 serial connection. Two drawbacks to this approach are:

(1) that it requires connections in all of the nodes within the cluster, with the bare minimum being a "daisy-chain" topology, where a node is connected to two others in the cluster; and (2) that, in some systems, adapter card slots are at a premium, and requiring two extra slots just for cluster liveness may be considered to be undesirable.

Another possible "non-IP" network makes use of the shared disk path: the SCSI bus. This approach solves the two drawbacks of the RS-232 networks—by not requiring any extra hardware—but it does have one drawback, namely, that it depends on specialized support in the operating system (not available for all device types) to allow nodes to communicate using the SCSI bus.

An alternative approach provided by the present invention is to use not the disk path, but the shared disk itself for transmitting liveness information. Data to be sent from one node to the other is written to the shared disk and is then retrieved by the destination node. This is the "building block" that allows a disk to "behave" like a network.

Figure 2:
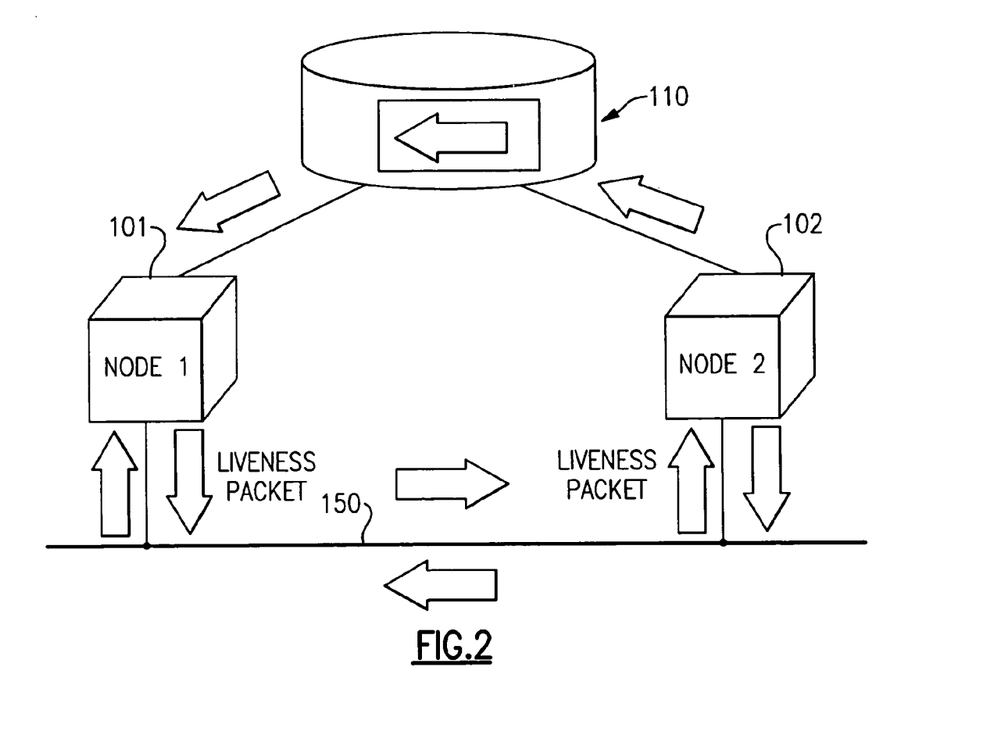
FIG. 2 is a schematic block diagram illustrating the flow of "liveness packets" not only through the normal communications network, but also through a shared disk which is used in the present invention with specially defined protocols to enable it use as a separated path for the transfer of "liveness packets."

One mode of operation of the present invention is illustrated in FIG. 2, where, for simplicity, the operation of only two nodes is considered. In particular, FIG. 2 illustrates that the use of the present invention permits two forms of data transfer to occur at the same time. Network connection 150 is shown being used specifically for the transfer of "liveness" information packets from Node 101 to Node 102 and vice versa. Additionally, the present invention provides, via reading and writing protocols and control information, an additional path for communication through shared disk 110.

The mechanism proposed herein is introduced in the context of its preferred use in the Topology Services subsystem, which is part of IBM's Reliable Scalable Cluster Technology (RSCT) infrastructure. Topology Services is the liveness layer of the system, being responsible for determining the set of working nodes, networks, and network adapters in the cluster. In terms of software hierarchy, Topology Services runs below Group Services, which provides group communications and protocols that are used by higher-level services such as cluster managers (including HACMP) and parallel databases.

Figure 3:
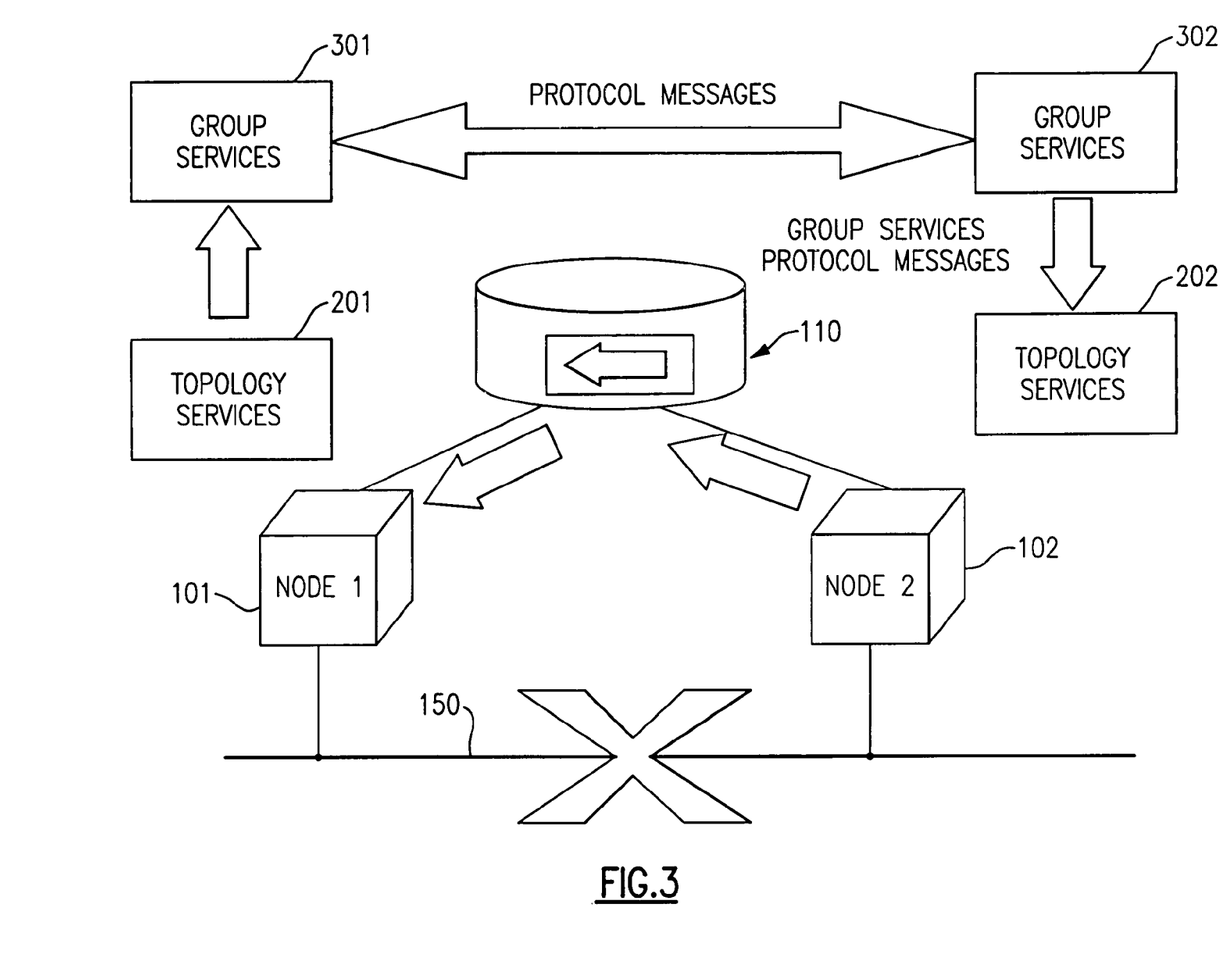
FIG. 3 is a functional block diagram similar to FIG. 2 but more particularly illustrating the roles played by a hierarchy of existing cluster services.

FIG. 3 illustrates existing services and their relationships. In particular, Node 101 uses, at the lowest level, Topology Services 201 (202 for Node 102) which communicates with Group Services 301 (302 for Node 102). Group Services is the IBM supplied utility layer that actually runs protocols that require data transfer between Node 101 and Node 102 through shared device 110. Group Services performs the actual transfer of protocol messages, as seen in FIG. 3. Group Services protocols proceed even in the absence of IP communication between Nodes 101 and 102 via network path 150. In this case, Group Services (say, 302) delivers its protocol messages to the local Topology Services (say, 202) daemon, which transmits the message via the disk to peer Node 102. At the destination node, the Topology Services daemon sends the message to the local Group Services daemon.

3—Disk Heartbeating in RSCT 3.1—Topology Services and Network Interface Modules

Topology Services has a well-defined interface between its higher-level adapter membership protocols—which are used to determine the set of adapters and nodes that are up and reachable—and its lower-level adapter specific communications. The interface is designed so that all adapter intricacies are handled by the lower-level Network Interface Module (NIM), which is a software layer standing between the liveness determination software (for example, Topology Services) and the communication devices used for liveness determination. This layer is responsible for the actual transfer of data, with the liveness determination software dealing with distributed system protocols. With such layering, adding support in Topology Services for a new network type means just adding a new NIM for the adapter.

Commands that the NIM implements to carry out this new function are of the following types:

connecting to local adapter (meaning is adapter-specific);
disconnecting from local adapter;
sending a message—send a message to a given destination;
start sending liveness messages;
stop sending liveness messages;

start monitoring liveness messages;
stop monitoring liveness messages;
NIM liveness checking;
exiting.

Responses from the NIM back to Topology Services are of the following types:
responding to a "connect" command;
providing local adapter up/down status;
providing remote adapter up/down status;
incoming message—sent by a remote node;
responding to NIM liveness check.

Figure 4:
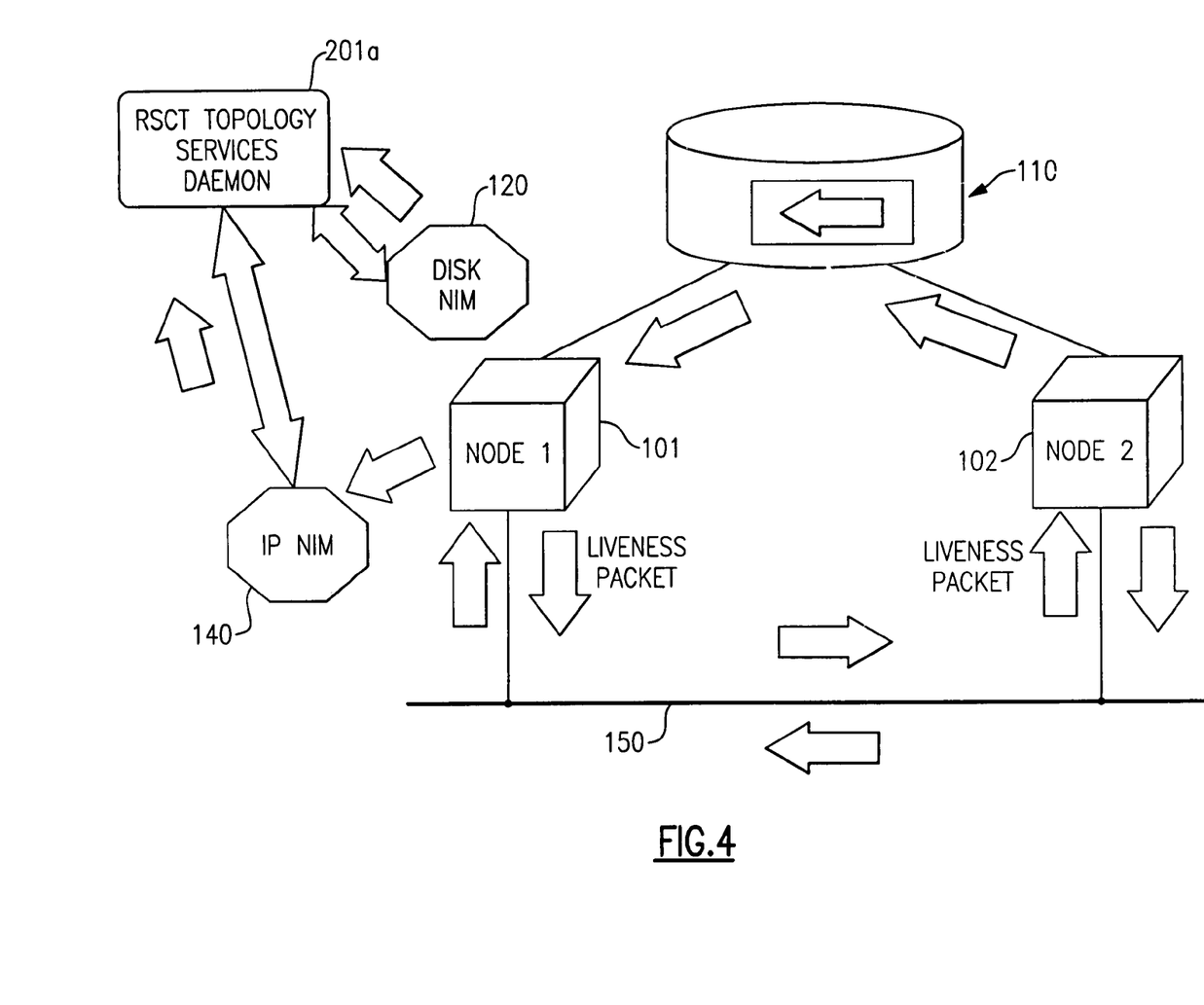
FIG. 4 is a functional block diagram similar to FIGS. 2 and 3 but more particularly illustrating the use of Network Interface Modules, and their interaction with other components, as a mechanism for providing commands which carry out protocols established for shared disk communications.

As seen in FIG. 4, Topology Services daemon 201a (which is part of Reliable Scalabable Cluster Technology (RSCT)) employs auxiliary processes "NIMs" (Network Interface Modules) to handle low-level communications with each specific network adapter. Protocol packets produced by the Topology Services daemon 201a are sent to each NIM, which then transmits the packet to the physical media. The same happens in reverse on the receive side: the packets are received by the NIMs and are then forwarded to Topology Services daemon 201a. While IP NIM 140 uses standard socket UNIX primitives to send and to receive data packets, disk NIM 120 uses its own protocol, which is based on storing packets on the disk until they can be retrieved by the destination node.

To allow the disk to be used as liveness communication medium, one just needs to create a NIM that implements commands and responses such as those listed above. Once this is done, the disk "behaves" just like any other network used by Topology Services. The disk is then used both to run liveness protocols and to transmit node-to-node messages for the RSCT Group Services subsystem. In case of an outage in all of the IP networks, the cluster still continues operating, with remote nodes still being considered up, and with cluster manager protocols being "routed" through the disk NIM. The latter is achieved with Topology Services computing node-to-node routes that bypass the IP networks (if these fail) and use any available disk paths.

3.2 The Disk Network Interface Module

To allow the shared disk to be used as communication medium, a portion of the disk is allocated for exclusive use of the new disk NIM. This portion of the disk is intended for sole use by the disk NIM and is not intended for write-access by the underlying operating system; this usually implies either: (1) that a whole disk partition is allocated just for the disk NIM; or (2) that certain disk blocks are left unused by the operating system.

Approach (1) tends to waste disk space and also requires that the data processing system administrator set up the dedicated partition, which adds to the overall manual work of getting the cluster up and running. Approach (2) eliminates the drawback above, but usually leaves only a very small disk area that can be used by the new disk NIM.

The NIM disk area is used by the disk NIM as a temporary packet storage area before the packet is retrieved by the remote side. Because disks cannot be read or written at the individual byte level but rather just on a sector basis, multiple nodes are therefore not allowed to write on the same sector, otherwise this will overwrite the data written by the another node. Sectors are thus "owned" by each node, which means that the sectors are given exclusive write access to one node or another by the NIM protocol.

Figure 5:
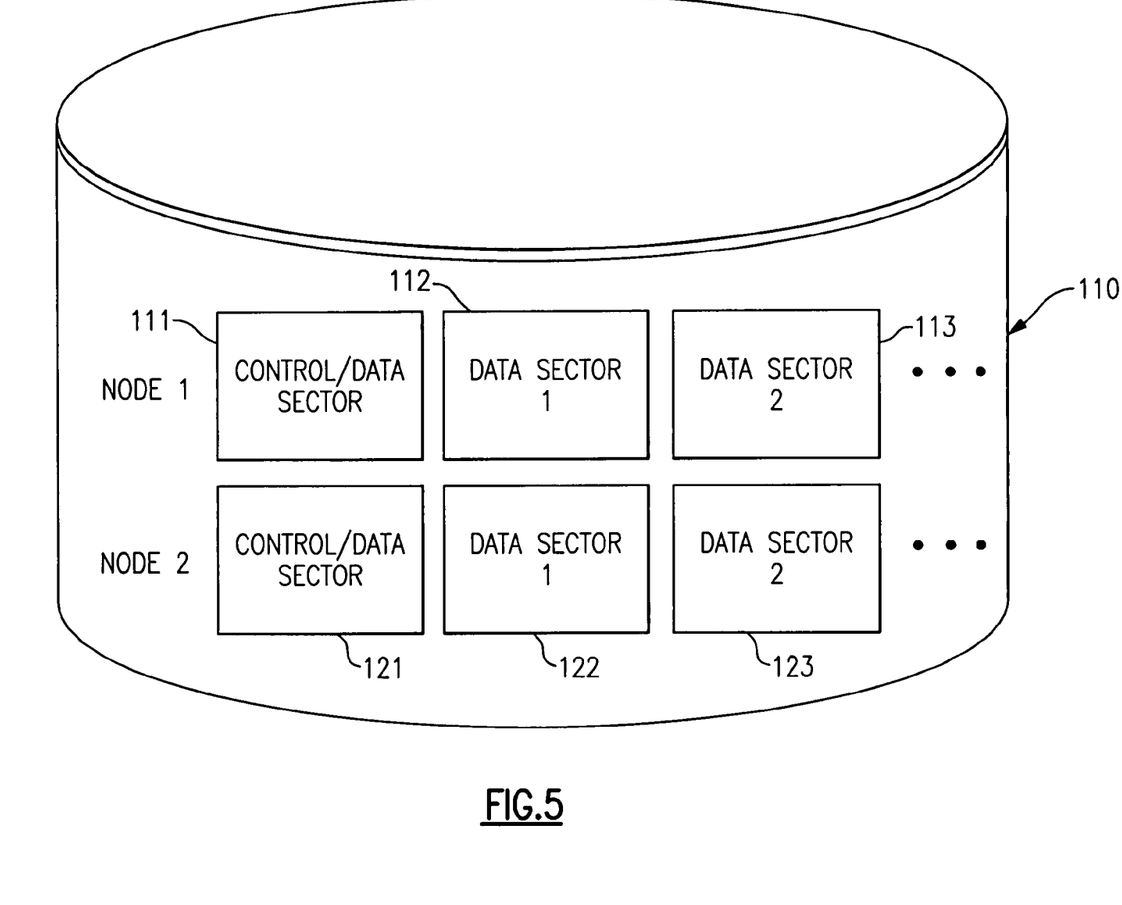
FIG. 5 is a disk layout for disk heartbeating. A group of sectors is "owned" by node 1 and another is "owned" by node 2. Only the owner of a sector may write to it.

FIG. 5 illustrates, from a higher level, a data structure that may be provided on shared disk 110 for carrying out the objectives of the present invention. In particular, data structure layouts are illustrated for two nodes: Node 1 and Node 2. Each node is allotted a sector which is used for both control and for data: Control/Data Sector 111 for Node 1 and Control/Data Sector 121 for Node 2. A group of sectors is "owned" by Node 1 and group of sectors is "owned" by Node 2. Only the owner of a sector may write to it. The other sectors owned by a node (Data Sectors 112 and 113 for Node 1 and Data Sectors 122 and 123 for Node 2, as shown) are used to transmit data only and are linked to Control/Data sectors via pointers or links such as those more particularly shown in FIG. 6. When only small amounts of data are to be transmitted, storage space available in Control/Data Sectors 111 and 121 are employed, thus obviating the need for separate disk access operations to different sectors. Thus, the shared disk area is used not only to store packets "in flight" but is also used to store concurrency and flow control information.

Some sectors are "owned" by the node "transmitting" a packet, while others are "owned" by the node "receiving" a packet. The "writer area" of the disk includes the actual packet being "transmitted," and the "reader area" includes information whether the given packet was already read.

Notice that since both sides of the disk connection each need to send and to receive packets, each side therefore owns a "writer area" and a "reader area."

To distinguish packets from one another, a monotonically increasing packet sequence number is associated with each packet. When a new packet is placed by the writer node, a new sequence number is also included with the packet, so that the reader knows that another packet is available. Once the packet is "consumed," the reader places, in its own area, the sequence number of the packet just read. This signals the writer that the disk area used by the packet is available for the next packet. To avoid losing packets unnecessarily when the reader is slow to receive packets, the writer does not overwrite a previously written packet until the reader signals that it has read the packet.

The mechanism above establishes flow control between the writer and the reader node. If the reader stops retrieving packets, then this forces the writer to stop writing new packets onto the disk. The writer then starts buffering new packets in memory, and eventually has to discard them. Such behavior is still acceptable for the NIM, because it is not much different than an IP NIM that runs out of operating system packet buffer space when the reader process stops consuming the packets. It is assumed that higher level Topology Services protocols issue any needed message send retries.

Figure 6:
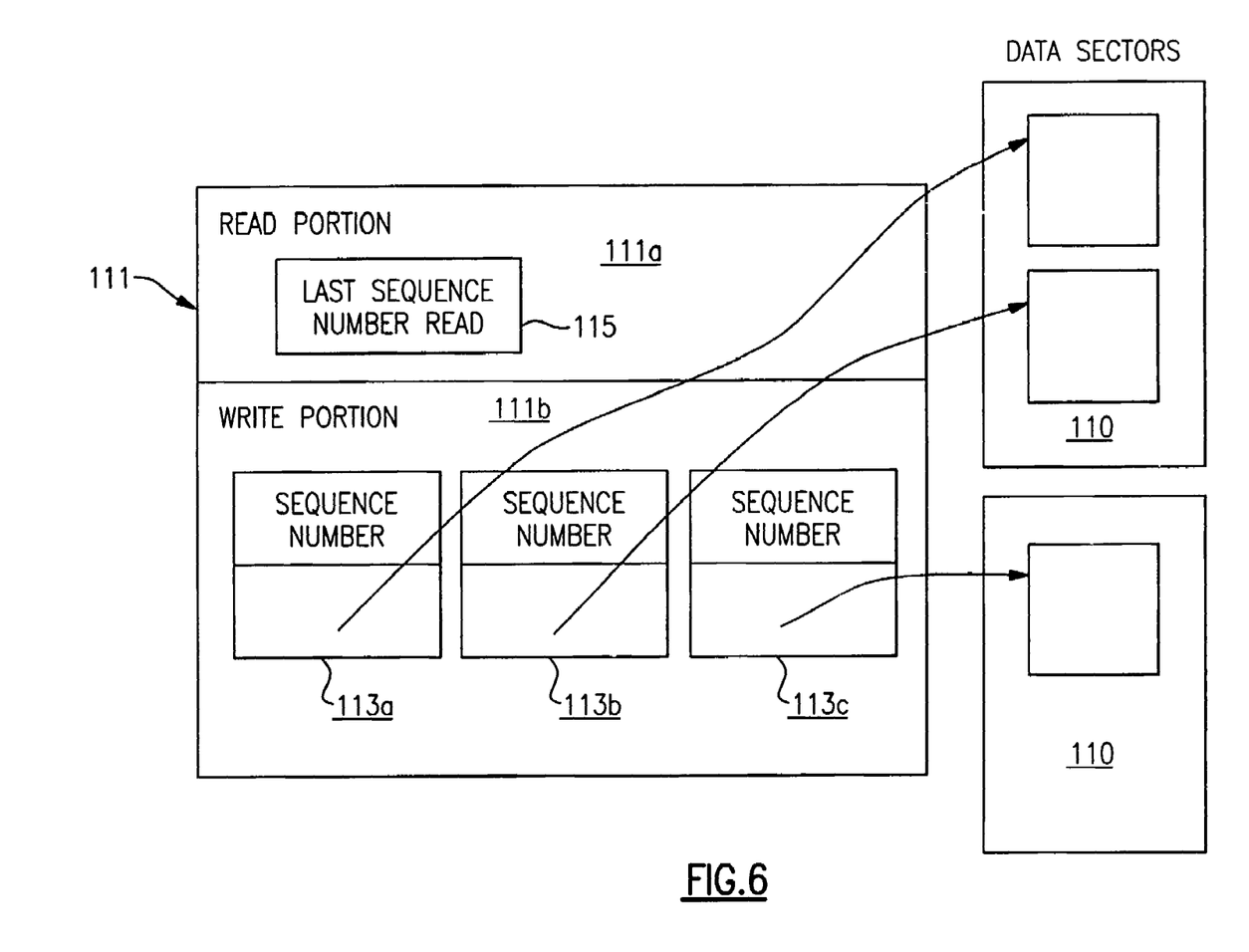
FIG. 6 is a schematic block diagram illustrating a data structure for storage areas used to establish information transfer protocols and, in particular, illustrating division into separate read and write portions.

FIG. 6 provides a more detailed view of Control/Data Sector 111 for Node 1. The structure for other nodes is similar. Control/Data Sector 111 is divided into Read Portion 111a and Write Portion 111b. Read Portion 111a contains an indication of the "last sequence number read" 115 associated with data packets written by another node, say Node 2. Write Portion 111b refers to a portion of sector 111 used by the owning node, Node 1 in this case, for storing data before it is read by another node. This area contains data to be transferred and/or, as shown in FIG. 6, pointers to various sectors of data on shared disk 110 to be transferred. Write Portion 111b is used by the non-owning node to locate the packets to be read.

3.3—Minimizing the Number of Disk Accesses

In carrying out the method of the present invention, it is desirable to reduce and/or to minimize the frequency of disk accesses, so as to avoid creating a performance penalty for cluster applications that are using the same shared disk.

The normal operation of the reader node is to read the writer's control sector periodically, waiting for a new packet to be added by the writer node. Once a new packet is added, the reader retrieves it and then updates its control sector with the sequence number of the packet it just read.

Once the writer has a new packet to transmit, it first reads the reader's control sector to retrieve the last sequence number read. The writer uses the sequence number information to determine which-packets have been read, and whose area in disk can be used for a new packet. Once the writer makes this determination, it first copies the new packet to the appropriate position in a data sector and finally updates the writer control sector with the sequence number of the new packet.

The procedure above, while correct, causes the writer to require too many disk accesses. The procedure is improved by using the following observations:
  (1) in a steady state, the reader should retrieve packets shortly after they are written; this implies that the writer usually should have little problem in finding "free" space to write a packet; and
  (2) packets that need to be transmitted to the remote node via the disk NIM are usually small (a few hundred bytes or less).

Given these observations the following optimizations are also implemented in preferred embodiments of the present invention:
  (1) the writer only needs to retrieve the reader's control sector (sequence number of last message read) if no more space in the writer's data area is available; and
  (2) small packets are written to the writer's control sector, rather than in a data sector; such a procedure saves one disk access.

With these optimizations, if the NIM area in the disk can fit X packets then in about (X−1) of X packet writes, the writer only needs to make a single disk access—a write into its control sector—to transmit a packet to the remote node. In the remaining (of the X packets) packet write, the writer finds out that it has no space to write, so it retrieves the reader's control sector and can then free up space it needs to write the packet.

Optimization is also possible on the reader's side. The "last sequence number read" field can be updated not with every single packet read, but only at every Y packet reads. This not only saves disk accesses on the reader side but is also compatible with the write side optimization described above, since the writer only has to retrieve the "last sequence number read" value at infrequent time intervals and therefore this value does not need to be updated frequently.

3.4—NIM Restart and Synchronization

The protocol used to convey packets from the writer to the reader should also withstand exiting the NIM process (either because of a failure in the NIM or because of the cluster being shut down on the node) on both the write side and the read side.

When the writer process restarts, it needs to determine the last sequence number it wrote in its previous "incarnation" (invocation). Resetting the sequence number to some initial value does not work, since, if the reader NIM's process did not restart, it expects the next message to come with the next sequence number.

To discover what sequence number to use, the writer retrieves its control sector and recovers the sequence numbers of the packets written by the previous incarnation of the writer. The sequence number to use is one greater than the sequence numbers listed in the writer's control sector.

When the reader process restarts, it checks the writer's sector as usual to determine what packets are available. The packets, however, should not be passed back to the upper layers in Topology Services, since the reader process may have been inactive for a long time, and the packets in the writer's area may be "stale." Since the overall goal of Topology Services is to provide liveness determination, the processing of old packets may have a detrimental effect on the subsystem's behavior. The packets retrieved on the reader's startup are therefore discarded. The reader marks the packets as "read" by setting the "last sequence number read" to the largest sequence number among those in the writer's control sector.

If the reader process is inactive when the writer process starts, the writer process will likely be blocked because the "last sequence number read" field in the reader's area does not get updated. Because the underlying goal of the NIM is to exchange messages with a remote node, there is nothing useful a NIM can do until the remote node (and its NIM) is up, and therefore not being able to send messages when the remote node is inactive is not seen as a problem.

3.5—Cold Start and Sector Assignment

For the very first startup of the disk NIM, the disk area reserved for NIM message exchange is not initialized. As a result, no valid information regarding posted packets exists at that time. This is solved by using "magic numbers" in the control sectors to denote that valid information is available. As used herein, the term "magic number" refers to a large number written to a memory/disk position so as to indicate that the overall memory/disk area which includes the number contains a certain type of data. The size and value of the "magic number" are chosen such that it is unlikely that any other kind of data written in the same position would have the same value as the given number. Since during first machine startup the magic numbers are not in place, the NIM "realizes" that the area is not initialized and then proceeds on its own with the initialization.

Assuming that the disk NIM is only fed with the very same information as that passed by the upper layers to the other NIMs, the disk NIM faces the basic problem of determining which area of the disk to use for the control and for the data sectors. While the location of the set of blocks reserved for disk heartbeating may be hard coded in the NIM (or determined on a file system or disk type basis), there remains the assignment of the portions inside the disk NIM area. One of the nodes may be writing data into some "area 1," while another node may be writing data into "area 2," but which node writes into which area needs to be determined. Accordingly, a protocol is introduced to decide what area to use for each node.

A disk sector (in a known location) is used in this protocol. It is assumed that the sector can be read from or written to atomically by each node—this is usually the case, since the sector is the minimum disk transfer unit. The sector contains the following pieces of data:
  node-unique-number;
  other-side-known flag; and
  a "magic" number Each node is capable of producing a unique number. This number can be a machine and/or operating system identifier (such as that provided by the Unix "uname" system call) or a cluster node number.

Protocol:

Loop
Write {local "node-unique-number," "unknown," "magic number"}
Wait for a random time
Read sector
   until node-unique-number !=local node-unique-number
   (this means the local node did not read what it wrote to disk)
   Retrieve remote node-unique-number. Compare local node-unique-number and remote node-unique-number.
   If local numerically less than remote then local will use "area 1" else "area 2"

Loop
Write {local "node-unique-number", "known", "magic number"}
Wait for a random time
Read sector
until node-unique-number !=local node-unique-number AND other-side-known=known At this point the local node knows which area it is going to use and that the remote node also has the same information.

However, the local node "A" cannot be sure that the remote node "B" can exit the loop above, since the remote node is awaiting for a {"A's node-unique-number", "known," "magic number"} pattern, but node "B" might have overwritten the sector with {"B's node-unique-number," "known," "magic number"}, and by leaving the loop above, node "A" will no longer update the shared sector.

There is then an exiting phase:

Loop
if not first time through this loop
   Wait for random time Y (>X) seconds    Write {local "node-unique-number," "known," "magic number"}    (I)

Read sector (1)    (II)

if node-unique-number=local node-unique-number
   Wait for X seconds
   Read sector (2)
until node-unique-number=local node-unique-number Correctness of this algorithm depends on each node taking less than X seconds between steps (I) and (II) above.

The main function provided by the program loop above is characterizable as follows: if the remote side does not write a record for X seconds after the local side writes its record, then the remote side is assumed to have been able to read what was written by the local node.

In addition, if the remote node is still at the previous loop, and it "sleeps" enough for the local node to run through the exiting loop, this means that the remote node is sleeping after its "write" and before its "read." The remote node's next read operation retrieves the record written by the local node, and this propels the remote node out of the loop. The local node now safely stops writing its "node-unique-number," and both NIMs are allowed to start with the normal protocols and to honor requests from upper software layers.

The invention above has been described with the assumption that the nonvolatile storage device is a rotating magnetic disk. However, it is noted that any kind of nonvolatile storage device is employable, including optical disk drives. The only requirement for such devices is that information can be written into and read from discrete, addressable areas on the devices; in the case of magnetic disk drives, such areas are referred to as sectors.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for liveness determination in a cluster of data processing nodes, said method on a first data processing node comprising the step of:
   providing at least two paths for communication of liveness information in which at least one of said paths includes a shared nonvolatile data storage device;
   determining whether an area on said shared nonvolatile data storage device is available for writing; and
   writing data, including an undated sequence number, from a first data processing node to said area on said shared nonvolatile data storage device if it is determined that said area on said shared nonvolatile data storage device is available;
   whereby said first node is able to determine when said area on said shared nonvolatile data storage device is available for writing after said data and said undated sequence number is transferred to a second node having read-only access to said area on said nonvolatile data storage device; and
   wherein said path with said nonvolatile data storage device is employed substantially continuously and concurrently with other liveness determination paths, whereby node liveness is determinable without having to resort to using secondary communication paths that are triggered by indications of liveness failure over other communication paths.

2. The method of claim 1 in which said nonvolatile data storage device is selected from the group consisting of magnetic disks and optical disks.

3. A method for communication in a multinode data processing system which includes at least one nonvolatile data storage device, said communication method comprising:
   determining that an area of said storage device reserved for write-access by a first node is available for use;
   transferring information from said first one of said nodes to said area of said storage device reserved for write-access by said first node, said information including an updated sequence number;
   retrieving said information by a second node having read-only access to said area of said storage device reserved far write-access by said first node;
   transferring said updated sequence number from said second node to an area of said storage device reserved for write-access by said second node, whereby said first node is able to determine when its associated write-access area is available for information transmission;
   determining a write sequence number based on sequence numbers associated with packets produced by the first node;
   determining a read sequence number based on a highest or lowest sequence number associated with packets read by the second node, whereby the first node can determine that its write area is available; and monotonically varying said write sequence number and transferring it with new information to said area of said storage device reserved for write-access by said first node.

4. The method of claim 3 further including the steps of:
whenever said second node is rebooted, determining said second node's write sequence number based on the packets present in said second node's write area;
determining the read sequence number based on the packets present in said first node's write area; and
transferring said read sequence number to said area of said storage device reserved for write-access by said second node, whereby said first node is thus able to determine that its write area is available for use.

5. The method of claim 3 in which said information is liveness information concerning said first node.

6. The method of claim 3 in which said area reserved for write-access by said first node includes a sector into which both control information and data are written.

7. The method of claim 6 in which said area reserved for write-access by said first node also includes at least one additional sector for data to be transferred.

8. The method of claim 6 in which information for transfer is limited in size to fit in said sector, whereby disk accessing operations are reduced in number.

9. The method of claim 3 in which said determining step is limited to determining whether or not space is available in said write-access area for said first node for information transfer, whereby access to said device for such determination is avoided.

10. The method of claim 3 which access to said nonvolatile data storage device is handled through a liveness network abstraction layer.

11. A method for initializing information on a nonvolatile storage device having access thereto shared between at least two nodes in a multinode data processing system, said method comprising:
writing, by a first node, information to a sector on said device in a location known to said first node and to a second node, said information containing: a node identifier for said first node, a flag indicating whether or not a node identifier of said second node is known, and a number indicating that said information in said sector contains data of a certain type;
waiting for a random period of time;
reading, by said first node, said information from said sector;
repeating said previous steps until the node identifier from said sector is different from the identifier for said first node; and
selecting, for use by said first node, an area on said device for writing further information, said selection being based upon a difference between said identifiers.

12. The method of claim 11 further including:
writing, by said first node, the further information to said selected area on said device for writing further information, the further information containing: said node identifier for said first node, a flag indicating whether or not the node identifier of said second node is known by said first node, and a number indicating that said information in said sector contains data of a certain type;
waiting for a random period of time;
reading, by said first node, said information from said sector;
repeating said previous steps until the node identifier from said sector is different from the identifier for said first node and until said flag indicates that said node identifier of said first node is known by said second node, whereby said first node now knows what area it is to use and also that said second node knows this as well.

13. A computer readable medium having computer executable instructions for causing a computer to provide at least two paths for communication of liveness information in which at least one of said paths includes a shared nonvolatile data storage device:
determining whether an area on said shared nonvolatile data storage device is available for writing; and
writing data, including an updated sequence number, from a first data processing node to said area on said shared nonvolatile data storage device if it is determined that said area on said shared nonvolatile data storage device is available;
whereby said first node is able to determine when said area on said shared nonvolatile data storage device is available for writing after said data and said updated sequence number is transferred to a second node having read-only access to said area on said nonvolatile data storage device; and
wherein said path with said nonvolatile data storage device is employed substantially continuously and concurrently with other liveness determination paths, whereby node liveness is determinable without having to resort to using secondary communication paths that are triggered by indications of liveness failure over other communication paths in a multinode data processing system with shared access to said nonvolatile data storage device.

* * * * *

UNITED STATES PATENT AND TRADEMARK OFFICE
CERTIFICATE OF CORRECTION

PATENT NO.        : 7,003,645 B2
APPLICATION NO.   : 10/323010
DATED             : February 21, 2006
INVENTOR(S)       : Felipe Knop et al.

It is certified that error appears in the above-identified patent and that said Letters Patent is hereby corrected as shown below:

Column 1,
Line 64, change "indication of between these" to -- indication of these --.

Column 2,
Line 24, change "which said this shared" to -- which this shared --.

Column 3,
Line 22, change "DESCRITPION" to -- DESCRIPTION --.
Line 39, change "enable it use" to -- enable its use --.
Line 51, change "it; and" to -- it. --.

Column 7,
Line 62, change "the another node" to -- another node --.

Column 8,
Line 22, change "information whether the" to -- information as to whether the --.

Column 11,
Line 3, change "by the Unix" to -- by the UNIX --.

Column 12,
Line 22, change "an undated sequence" to -- an updated sequence --.
Line 29, change "said undated" to -- said updated --.
Line 55, change "reserved far write-access" to -- reserved for white-access --.

Column 13,
Line 31, change "claim 3 which" to -- claim 3 in which --.

UNITED STATES PATENT AND TRADEMARK OFFICE
CERTIFICATE OF CORRECTION

PATENT NO. : 7,003,645 B2
APPLICATION NO. : 10/323010
DATED : February 21, 2006
INVENTOR(S) : Felipe Knop et al.

It is certified that error appears in the above-identified patent and that said Letters Patent is hereby corrected as shown below:

<u>Column 14,</u>
Line 26, change "storage device:" to -- storage device; --.

Signed and Sealed this

Twentieth Day of June, 2006

JON W. DUDAS
*Director of the United States Patent and Trademark Office*